(12) United States Patent
Tse et al.

(10) Patent No.: US 9,014,633 B2
(45) Date of Patent: Apr. 21, 2015

(54) BLUETOOTH COMMUNICATION SYSTEM AND METHOD FOR SELECTIVELY SWITCHING MODES OF OPERATION IN BETWEEN ELECTRONIC DEVICES

(71) Applicants: Kin-Man Tse, Hong Kong (HK); Wai-Pun Chung, Hong Kong (HK)

(72) Inventors: Kin-Man Tse, Hong Kong (HK); Wai-Pun Chung, Hong Kong (HK)

( * ) Notice: Subject to any disclaimer, the term of this patent is extended or adjusted under 35 U.S.C. 154(b) by 0 days.

(21) Appl. No.: 13/788,338

(22) Filed: Mar. 7, 2013

(65) Prior Publication Data
US 2014/0256259 A1     Sep. 11, 2014

(51) Int. Cl.
*H04W 4/00*     (2009.01)

(52) U.S. Cl.
CPC ................... *H04W 4/008* (2013.01)

(58) Field of Classification Search
CPC ............. H04W 52/0216; H04W 72/1215; H04W 72/1252; H04W 72/1289
USPC ............ 455/41.2, 127.4, 160.1; 370/217, 219
See application file for complete search history.

(56) References Cited

U.S. PATENT DOCUMENTS

| | | | | |
|---|---|---|---|---|
| 6,154,642 A * | 11/2000 | Dumont et al. | ............... | 455/403 |
| 6,165,069 A * | 12/2000 | Sines et al. | ............... | 463/12 |
| 6,603,704 B2 * | 8/2003 | Wilson | ............... | 365/230.08 |
| 6,722,974 B2 * | 4/2004 | Sines et al. | ............... | 463/12 |
| 6,745,038 B2 * | 6/2004 | Callaway et al. | ............... | 455/456.1 |
| 7,244,944 B2 * | 7/2007 | White | ............... | 250/370.1 |
| 7,327,981 B2 * | 2/2008 | Hundal | ............... | 455/41.2 |
| 7,354,002 B2 * | 4/2008 | White | ............... | 235/462.46 |
| 7,916,737 B2 * | 3/2011 | Akahane | ............... | 370/400 |
| 8,099,074 B2 * | 1/2012 | Ebner et al. | ............... | 455/343.3 |
| 8,290,186 B2 * | 10/2012 | Jung | ............... | 381/311 |
| 8,364,204 B2 * | 1/2013 | Cho | ............... | 455/558 |
| 8,406,316 B2 * | 3/2013 | Sugita et al. | ............... | 375/259 |
| 8,416,767 B2 * | 4/2013 | Wang et al. | ............... | 370/352 |
| 8,472,913 B2 * | 6/2013 | Ebner et al. | ............... | 455/343.3 |
| 8,711,823 B2 * | 4/2014 | Yeh et al. | ............... | 370/338 |
| 2005/0136848 A1 * | 6/2005 | Murray | ............... | 455/79 |
| 2005/0197061 A1 * | 9/2005 | Hundal | ............... | 455/41.2 |
| 2009/0190600 A1 * | 7/2009 | Akahane | ............... | 370/400 |
| 2010/0042013 A1 * | 2/2010 | Cuesta Frau et al. | ............... | 600/549 |
| 2010/0316099 A1 * | 12/2010 | Sugita et al. | ............... | 375/219 |
| 2011/0167133 A1 * | 7/2011 | Jain | ............... | 709/219 |
| 2012/0071106 A1 * | 3/2012 | Kadous et al. | ............... | 455/67.11 |
| 2012/0163481 A1 * | 6/2012 | Ebner et al. | ............... | 375/259 |
| 2012/0319982 A1 * | 12/2012 | Sato | ............... | 345/173 |
| 2013/0344813 A1 * | 12/2013 | Ebner et al. | ............... | 455/66.1 |
| 2014/0159877 A1 * | 6/2014 | Huang | ............... | 340/12.5 |

* cited by examiner

*Primary Examiner* — Minh D Dao
(74) *Attorney, Agent, or Firm* — Sonya C. Harris; Invention Services Gaff Myer IPS

(57) ABSTRACT

Disclosed is a Bluetooth Communication System and related method thereof for switching mode of operations between electronic devices. The system comprising a first Bluetooth enabled electronic device, one or more second Bluetooth enabled electronic devices, wherein the first Bluetooth enabled electronic device comprising a Bluetooth chip, a processing circuitry, and a user operable interface configured thereon to switch the processing circuitry to a desired second Bluetooth enabled electronic devices, and switch operational mode of the desired second Bluetooth enabled electronic devices from a first mode of operation to a second mode of operation or vice versa to establish a Bluetooth communication link between the first Bluetooth enabled electronic device and desired second Bluetooth enabled electronic device.

14 Claims, 4 Drawing Sheets

BLUETOOTH COMMUNICATION SYSTEM AND METHOD FOR SELECTIVELY SWITCHING MODES OF OPERATION IN BETWEEN ELECTRONIC DEVICES

FIELD OF INVENTION

The present invention relates to the field of short distance wireless communications, more specifically to a Bluetooth Communication System and an associated method for switching modes of operation between electronic devices, such as switching NFC enabled speaker between multiple NFC enabled mobile phones.

BACKGROUND OF THE INVENTION

Bluetooth communication system generally provides a communication channel between two electronic devices via a short-range radio link. The Bluetooth radio link is intended to be a cable replacement between two or more mobile and/or fixed electronic devices. The mobile or fixed electronic devices include mobile phones, audio headsets, laptop computers, speakers, and the like with different or same operating systems.

The Bluetooth communication system is a low-cost, low-power and short-distance wireless communication technology extensively used in all kinds of mobile and/or fixed electronic devices used in day to day life. The built-in Bluetooth chip of these devices not only can perform two-way wireless transmissions, but also can provide user-friendly functions. The Bluetooth signal transfer facility of these devices provides the technological advantages of hands-free functions.

Bluetooth communication system can be either point-to-point or point-to-multipoint to provide connection links among multiple electronic devices. When one Bluetooth device communicates with another Bluetooth device, one will generally be a sending device and the other would be a recipient device. There always exists a need to identify the recipient device or pair up a desired recipient device with the sending device. This is necessary because, without such proper and desired paring, there is possible that the sending device may be accidentally connected to a wrong recipient device producing wrong outcomes.

In the light of aforementioned discussion, there exists a need for a Bluetooth communication system and an associated method thereof for switching modes of operation between electronic devices using a user operable interface system.

BRIEF SUMMARY OF THE INVENTION

According to the first aspect of the present invention, there is provided a Bluetooth communication system which includes a first Bluetooth enabled electronic device, multiple second Bluetooth enabled electronic devices, wherein the first Bluetooth enabled electronic device including a Bluetooth chip, a processing circuitry, and a user operable interface configured thereon to switch the processing circuitry to a desired second Bluetooth enabled electronic devices, and switch operational mode of the desired second Bluetooth enabled electronic devices from a first mode of operation to a second mode of operation or vice versa to establish a Bluetooth communication link therewith.

According to the second aspect of the present invention, there is provided a method for operating the Bluetooth communication system which includes a first Bluetooth enabled electronic device, multiple second Bluetooth enabled electronic devices, the first Bluetooth enabled electronic device includes a Bluetooth chip, a processing circuitry, and a user operable interface, the method includes switching the processing circuitry to a desired second Bluetooth enabled electronic devices, using the user operable interface, switching operational mode of the desired second Bluetooth enabled electronic devices from a first mode of operation to a second mode of operation or vice versa, using the user operable interface, and establishing a Bluetooth communication link between the first Bluetooth enabled electronic device, and each of the second Bluetooth enabled electronic devices.

This summary introduces concepts of Bluetooth and/or short range wireless communication technology, and the concepts are further described below in the Detailed Description. Accordingly, the summary should not be considered to identify essential features nor used to limit the scope of the claimed subject matter.

BRIEF DESCRIPTION OF DRAWINGS

Embodiments of Bluetooth and wireless communications are described with reference to the following drawings. The same numbers are used throughout the drawings to reference like features and components.

DETAILED DESCRIPTION OF PREFERRED EMBODIMENTS

Figure 1:
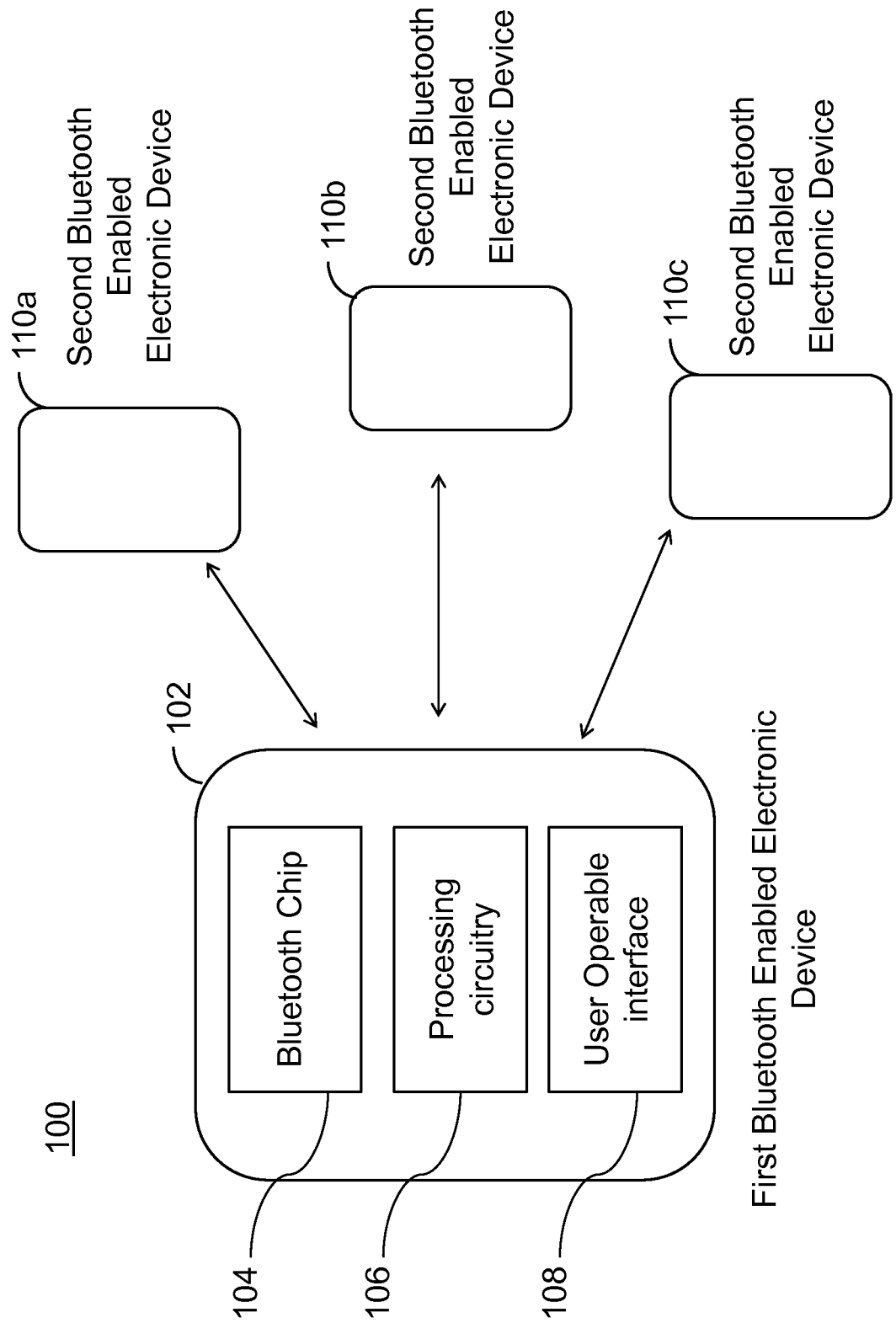
FIG. 1 illustrates a Bluetooth communication system in accordance with an exemplary embodiment of the present invention.

It is to be understood that the phraseology and terminology used herein is for the purpose of description and should not be regarded as limiting. As used herein, the terms "chip" "integrated circuit" or similar terms, are used interchangeably, as used in the electronics. The present invention is applicable to all the above as these terms are generally understood in the field.

The present invention is directed towards a point-to-multipoint Bluetooth communication system to provide connection links among a plurality of electronic devices simultaneously. Multiple devices can be operatively connected to form a piconet, where, at a given period, one of the devices serves as the master while the others as the slaves.

Reference will now be made in detail to one or more embodiments of the invention, example of one of which is illustrated in the drawings. The example and embodiment is provided by way of explanation of the invention, and is not meant as a limitation of the invention. For example, features illustrated or described as part of one embodiment may be used with another embodiment to yield still a further embodiment.

Turning now to accompanying drawings FIG. 1-FIG. 4, FIG. 1, in particular which shows a Bluetooth communication system 100 in accordance with the present invention. As shown, the system 100 includes a first Bluetooth enabled electronic device 102 having incorporated a Bluetooth chip 104 and an associated processing circuitry 106, and a user operable interface 108 associated therewith to enable a user to selectively pair up and switch the first Bluetooth enabled electronic device 102 among one or more second Bluetooth enabled electronic devices 110a, 110b, and 110c, as shown. The user operable interface 108 configuration helps switching the processing circuitry 106 to a desired second Bluetooth enabled electronic devices 110a, 110b, and 110c, and switch operational mode of the desired second Bluetooth enabled electronic devices 110a, 110b, and 110c from a first mode of operation to a second mode of operation or vice versa to establish a Bluetooth communication link. The user operable interface 108 switches and associates the first Bluetooth enabled electronic device 102 with an unused second Bluetooth enabled electronic devices 110a, 110b, and 110c to establish a Bluetooth communication link therewith and continue the communication till the user operable interface 108 is switched again by the user.

The functional aspect of the present invention will be explained in detail with respect to FIG. 2 and FIG. 3 where there is shown the first Bluetooth enabled electronic device i.e. a speaker (for example) 102 capable of establishing Bluetooth communication simultaneously with plurality of Bluetooth enabled electronic devices i.e. three NFC enabled mobile phones (for example) 110a, 110b, and 110c and is also capable of enabling the user to switch the operating speaker 102 between the mobile phones 110a, 110b, and 110c.

Figure 2:
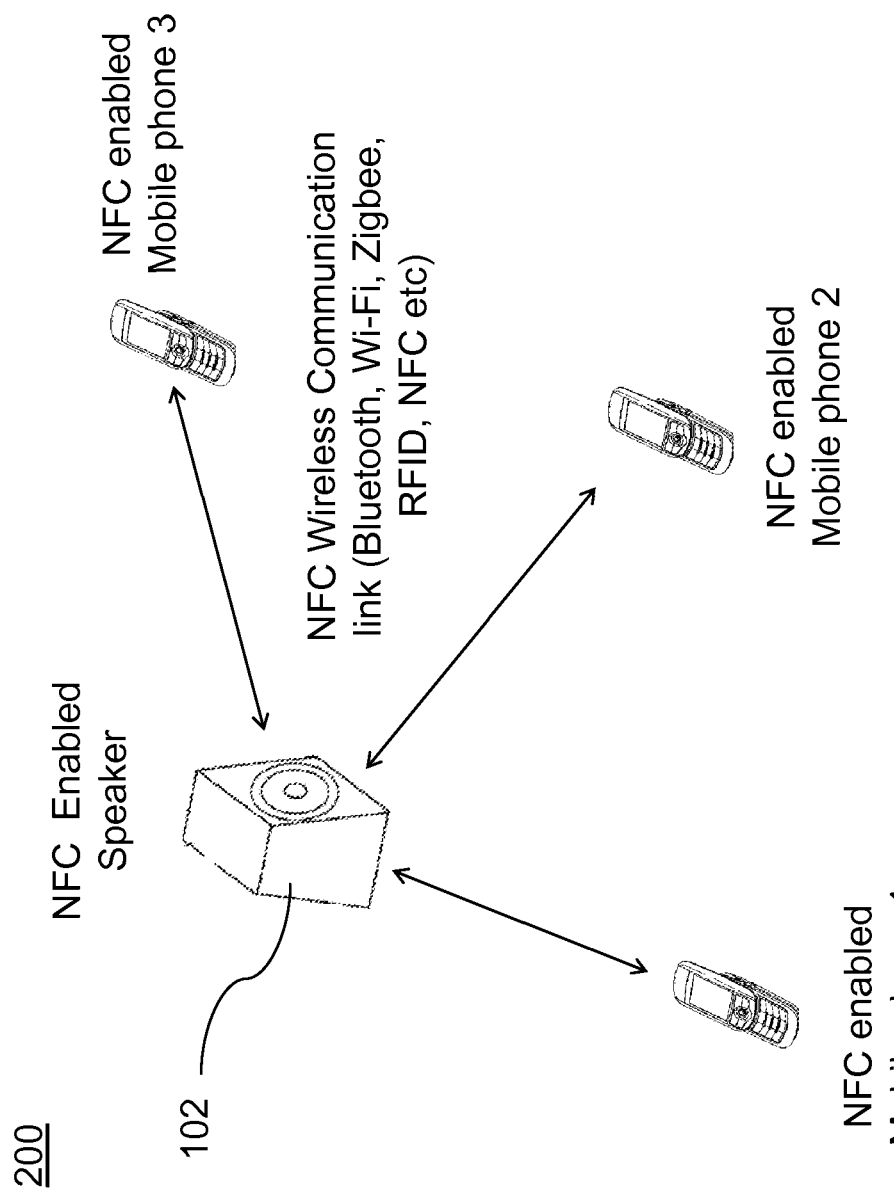
FIG. 2 illustrates an example mobile phone switching environment according to an embodiment of the present invention.
Figure 3:
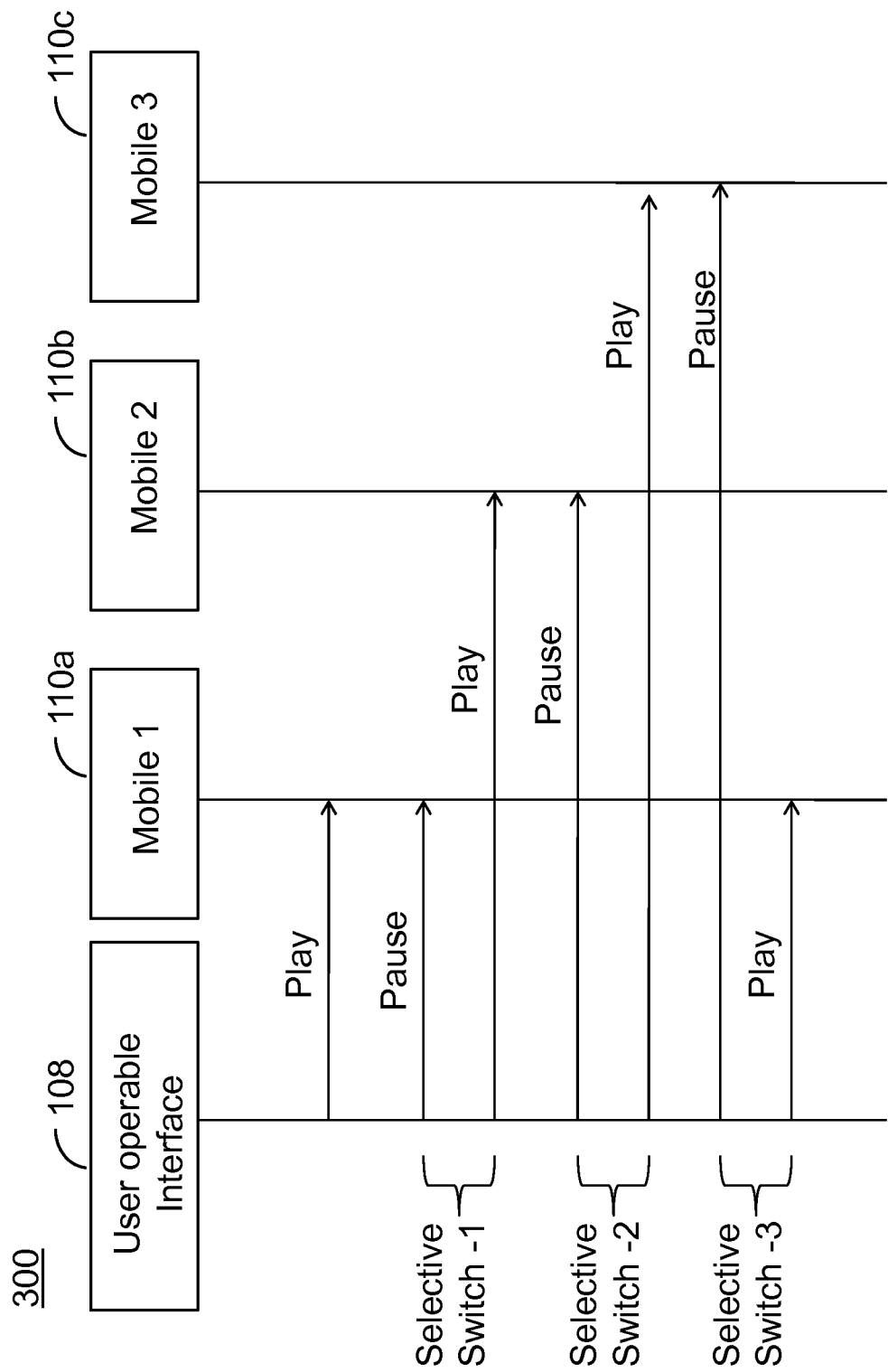
FIG. 3 illustrates one example of a user operable interface switching according to the present invention.

FIG. 2-FIG. 3 as shown illustrates one example of the user operable interface switching according to the present invention. As shown, the NFC enabled speaker 102 establishes a Bluetooth connection with the mobile phones 110a, 110b, and 110c simultaneously to communicate and switch the speakers' 102 operation between them. The switching is implemented by actuation of the user operable interface 108 incorporated preferably in the speaker 102. The user operable interface 108 can be in the form of manual switch, a remote form, or the like. When actuated, the user operable interface 108 switches the processing circuitry 106 to connect to one of the mobile phones 110a, 110b, and 110c, and switch the operational mode of the mobile phone 110a, or 110b, or 110c in connection from one mode of operation i.e. active transmission mode to an another operational mode i.e. inactive transmission mode or vice versa.

As best described in FIG. 3 with an example to show how the user operable interface 108 helps in switching the operations of the speaker 102 between the mobile phones 110a, 110b, and 110c. According to the embodiment, the speaker 102 on detecting the proximity of the mobile phones 110a, 110b, and 110c establishes the Bluetooth connectivity therewith, and the speaker 102 communicates with a particular mobile phone 1 to play audio being played in the mobile phone 1. The user when selectively switches the speaker to mobile phone 2, a signal is sent to the mobile phone 1 to pause the audio being played thereon, and simultaneously a play signal to the mobile phone 2 to play the audio being played by the mobile phone 2. Similarly, when the user selectively switches the speaker to mobile phone 3, a signal is sent to the mobile phone 2 to pause the audio being played thereon, and simultaneously a play signal to the mobile phone 3 to play the audio being played by the mobile phone 3. Further, when the user selectively switches the speaker to mobile phone 1 again, a signal is sent to the mobile phone 3 to pause the audio being played thereon, and simultaneously a play signal to the mobile phone 1 to play the audio being played by the mobile phone 1.

Figure 4:
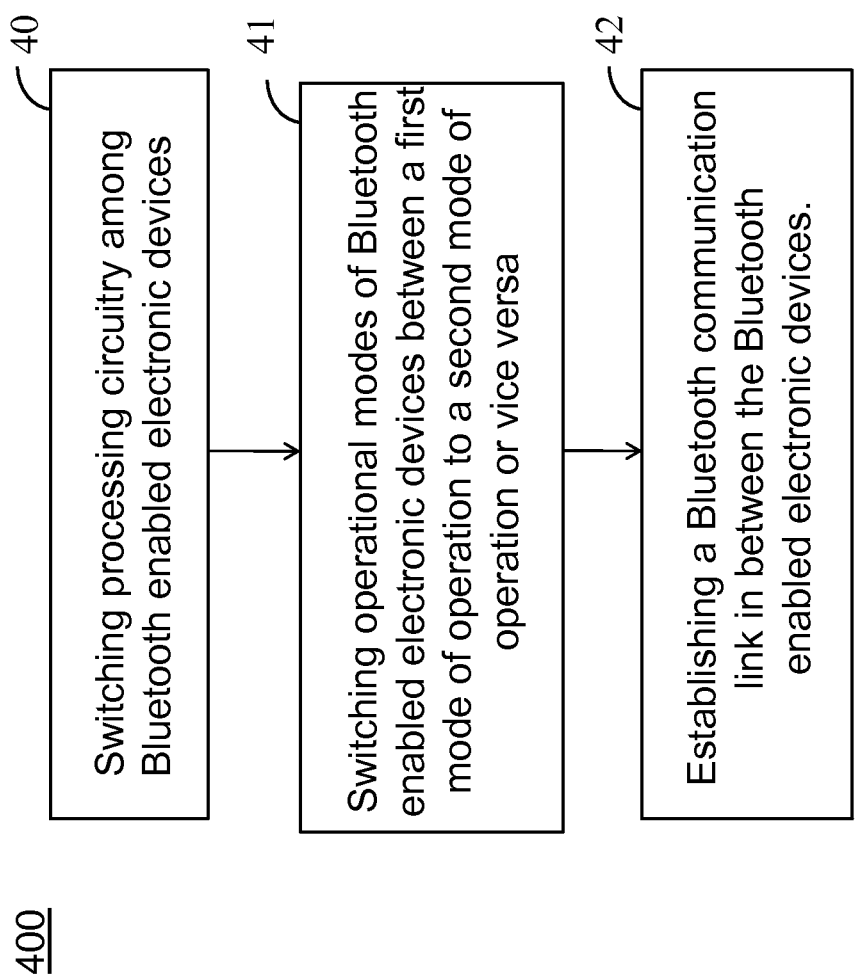
FIG. 4 illustrates an example method of a Bluetooth communication according to the present invention.

Referring to FIG. 4 is an example method of a Bluetooth communication according to the present invention. The method 400 starts at step 41 which describes switching a processing circuitry 106 of a Bluetooth enabled electronic device 102 among plurality of Bluetooth enabled electronic devices 110a, 110b, and 110c. The user operable interface 108 of the Bluetooth enabled electronic device 102 switches the processing circuitry 106 among plurality of Bluetooth enabled electronic devices 110a, 110b, and 110c. The user operable interface 108 preferably includes a manual switch, a switch in the remote form, and the like.

Next the step 42 describes switching operational modes of Bluetooth enabled electronic devices 110a, 110b, and 110c between a first mode of operation (an active transmission mode or play mode) to a second mode of operation (an inactive transmission mode or pause mode) or vice versa. By the way of an example, plurality of mobile phones phone 1, phone 2, and phone 3 can be switched between their operational modes of operation when they are in Bluetooth communication with a speaker configured to play audio being played by the mobile phones, as best explained in conjunction with FIG. 3 above. Further the step 43 describes establishment of a Bluetooth communication link in between the Bluetooth enabled electronic devices mobile phones, and the like.

Although embodiments of the system is explained considering specific electronic devices like speaker and phones and specifically use of Bluetooth communication, it is to be understood that the subject of the appended claims is not necessarily limited to the specific types of electronic devices and only to Bluetooth communication. For example, one or more other mobile communication devices or consumer devices and other short range wireless communication like Wi-Fi, Wireless Local Area Network (WLAN), Infrared Data Association (IrDA), Zigbee, Radio Frequency Identification (RFID), and Near Field Communication (NFC), and the like can be used instead of the specific electronic devices and Bluetooth communication described above and still achieve desirable results. Moreover, the specific systems and methods are disclosed as example implementations of Bluetooth and short range wireless communication technology.

While the present invention has been described in connection with certain preferred embodiments, it is to be understood that the subject matter encompassed by way of the present invention is not to be limited to those specific embodiments. On the contrary, it will be appreciated that some hardware components may be used with other hardware components or articles. It is intended for the subject matter of the invention to include all alternatives, modifications and equivalents as can be included within the spirit and scope of the invention.

The invention claimed is:

1. A piconet system for point to multi-point Bluetooth communication, comprising:
   a first Bluetooth enabled electronic device;
   a plurality of second Bluetooth enabled electronic devices; and
   wherein said first Bluetooth enabled electronic device comprising a Bluetooth chip, a processing circuitry, and a user operable interface configured thereon to,
   switch said processing circuitry to a desired one of said plurality of second Bluetooth enabled electronic devices, and
   switch operational mode of the desired one of said plurality of second Bluetooth enabled electronic devices from a first mode of operation to a second mode of operation or vice versa to establish a Bluetooth communication link therewith; and
   wherein said user operable interface includes a set of switches for simultaneous point to multi-point switching operational modes of said plurality of second Bluetooth enabled electronic devices.

2. The piconet system of claim 1, wherein said user operable interface is configured to switch between an unused one of said plurality of second Bluetooth enabled electronic devices to establish a Bluetooth communication link with said first Bluetooth enabled electronic device.

3. The piconet system of claim 2, wherein said first Bluetooth enabled electronic device is communicatively linked to each of said plurality of second Bluetooth enabled electronic devices.

4. The piconet system of claim 3, wherein said first Bluetooth enabled electronic device is a near field communication enabled speaker configured to play audio in an active mode.

5. The piconet system of claim 4, wherein said plurality of second Bluetooth enabled electronic devices includes a mobile phone communication device.

6. The piconet system of claim 5, wherein said first mode of operation is an active play transmission mode.

7. The piconet system of claim 6, wherein said second mode of operation is an inactive pause transmission mode.

8. A method for operating a piconet system for point to multi-point Bluetooth communication comprising
providing a first Bluetooth enabled electronic device, a plurality of second Bluetooth enabled electronic devices, said first Bluetooth enabled electronic device including a Bluetooth chip, a processing circuitry, and a user operable interface including a set of switches for simultaneous point to multi-point switching operational modes of said plurality of second Bluetooth enabled electronic devices, the method comprising the steps of:
switching said processing circuitry to a desired one of said plurality of second Bluetooth enabled electronic devices, using said user operable interface;
switching operational mode of the desired one of said plurality of second Bluetooth enabled electronic devices from a first mode of operation to a second mode of operation or vice versa, using said user operable interface; and
establishing a Bluetooth communication link between said first Bluetooth enabled electronic device, and each of said plurality of second Bluetooth enabled electronic devices.

9. The method for operating a piconet system for point to multi-point Bluetooth communication of claim 8 further comprising switching between an unused one of said plurality of second Bluetooth enabled electronic devices to establish the Bluetooth communication link with said first Bluetooth enabled electronic device.

10. The method for operating a piconet system for point to multi-point Bluetooth communication of claim 9, wherein said switching is implemented by means of said user operable interface.

11. The method for operating a piconet system for point to multi-point Bluetooth communication of claim 10, wherein said first Bluetooth enabled electronic device is a near field communication enabled speaker configured to play audio in an active mode.

12. The method for operating a piconet system for point to multi-point Bluetooth communication of claim 11, wherein said plurality of second Bluetooth enabled electronic devices includes a mobile phone communication device.

13. The method for operating a piconet system for point to multi-point Bluetooth communication of claim 12, wherein said first mode of operation is an active play transmission mode.

14. The method for operating a piconet system for point to multi-point Bluetooth communication of claim 13, wherein said second mode of operation is an inactive pause transmission mode.

* * * * *